United States Patent
Cronin et al.

(10) Patent No.: US 12,388,740 B2
(45) Date of Patent: Aug. 12, 2025

(54) SANDBOX ENVIRONMENT FOR EVALUATING ARBITRARY ROUTE CONTROL FUNCTION (RCF) PROGRAM STATEMENTS

(71) Applicant: Arista Networks, Inc., Santa Clara, CA (US)

(72) Inventors: David Cronin, Dublin (IE); Matthieu Loriol, Vancouver (CA)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/393,234

(22) Filed: Dec. 21, 2023

(65) Prior Publication Data

US 2025/0211514 A1    Jun. 26, 2025

(51) Int. Cl.
*G06F 15/173* (2006.01)
*H04L 43/12* (2022.01)
*H04L 43/18* (2022.01)
*H04L 43/55* (2022.01)

(52) U.S. Cl.
CPC .............. *H04L 43/55* (2022.05); *H04L 43/12* (2013.01); *H04L 43/18* (2013.01)

(58) Field of Classification Search
CPC ................................ H04L 43/55; H04L 43/12
See application file for complete search history.

(56) References Cited

U.S. PATENT DOCUMENTS

| | | | | |
|---|---|---|---|---|
| 11,474,814 B1* | 10/2022 | Warfield | ............. | G06F 11/3051 |
| 2019/0258756 A1* | 8/2019 | Minwalla | ............... | G06N 20/00 |
| 2022/0124031 A1* | 4/2022 | Padhye | .................. | H04L 43/14 |
| 2023/0396528 A1* | 12/2023 | Hughes, Jr. | ............. | H04L 43/55 |
| 2025/0047708 A1* | 2/2025 | Albero | ................ | H04L 63/1491 |

* cited by examiner

*Primary Examiner* — Duyen M Doan
(74) *Attorney, Agent, or Firm* — Fountainhead Law Group, PC

(57) ABSTRACT

A sandbox execution environment is described. The sandbox environment simulates the execution environment of a live network device. The sandbox environment allows a user to write and test RCF (routing control function) functions without having to configure a device for testing purposes. The sandbox environment accepts global variables to initialize the context for executing the user-provided RCF functions such as path attributes and environmental variables.

20 Claims, 8 Drawing Sheets

```
ip community-list COMM_LIST 300:400    ⌒ global variable, 602 router general
    control-functions
        code unit FOO
            function foo() {
                if med is 10 or true { # this is a bug
                    bar();
                    return true;
                }
                return false;
            }
            EOF
        code unit BAR
            function bar() {
                community add COMM_LIST;
            }
            EOF
med.yaml
    med_set:
        // verify: if med is set then bar is executed by foo
        function: foo
          input_attributes:
            med: 10
    med_unset:
        // verify: if med is NOT set then bar is NOT executed by foo
        function: foo
          input_attributes:
            med: 0
```

Braces in right margin:
- RCF function, 604 (covers the router general block)
- routing policy, 606 (points to med.yaml block)

CLI, 600

FIG. 6A

```
control-functions > compile    ⌒ compile command, 612
    compilation successful control-functions > evaluate med.yaml    ⌒ run command, 614
    med_set:
        returned: true
        modified:
            community: ...
    med_unset:
        returned: true
        modified:
            community: ...
```

Brace on right: evaluation result, 616

CLI, 600

FIG. 6B

SANDBOX ENVIRONMENT FOR EVALUATING ARBITRARY ROUTE CONTROL FUNCTION (RCF) PROGRAM STATEMENTS

CROSS REFERENCE TO RELATED APPLICATIONS

The present disclosure relates to commonly owned U.S. Pub. No. US 2023/0038824 (U.S. application Ser. No. 17/392,519), entitled "Efficient Runtime Evaluation Representation, External Construct Late-binding, and Updating Mechanisms For Routing Policies," filed Aug. 3, 2021, and is incorporated herein by reference in its entirety for all purposes.

BACKGROUND

Border Gateway Protocol (BGP) is a known and well understood protocol that is used by edge devices at the edge (entry/exit point) of a network core to exchange routing and reachability information (BGP paths, also referred to variously as routes, network paths, and the like) with other edge devices (BGP neighbors) on the core's edge.

Routing policies in a network device (e.g., switch, router, etc.) can specify which network paths (e.g., BGP paths) are programmed into its routing tables and how those paths are advertised. Users can create routing policies using tools called route maps which comprise route map commands to configure paths such as permitting or denying paths, modify paths, perform conditional actions, and so on.

Routing Control Function (RCF) is a routing policy technology that is developed and sold/licensed by Arista Networks, Inc. of Santa Clara, California. RCF is described in commonly owned U.S. application Ser. No. 17/392,519, entitled "Efficient Runtime Evaluation Representation, External Construct Late-binding, and Updating Mechanisms For Routing Policies," the content of which is incorporated herein by reference in its entirety for all purposes. More particularly, RCF is a programming tool that allows the user to define functions (referred to as policy functions) to programmatically evaluate network paths for route filtering and attribute modification. Users (e.g., network or system administrators) can write policy functions that express and evaluate policies such as route filtering and attribute modification in a programmatic fashion to facilitate processing of paths. Common multi-line policy directives that may occur in multiple places in a routing policy can be replaced by discrete policy (RCF) functions to improve readability, support, and maintenance.

For users writing RCF functions, in order to evaluate or test their RCF functions they may need to spin up BGP or other similar agent that uses RCF, and configure BGP to receive network paths that can be evaluated. In order to receive specific network paths, the user may need a tool to send specific BGP paths to their device or to configure other BGP instances in order to construct the desired paths for input to their RCF function. The overhead of setting up BGP presents an obstacle to learning, writing, and testing RCF because the user first needs to understand the mechanics of setting up BGP or other similar protocols in order to use RCF.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 6A and 6B show an illustrative sandbox session.

DETAILED DESCRIPTION

Figure 1B:
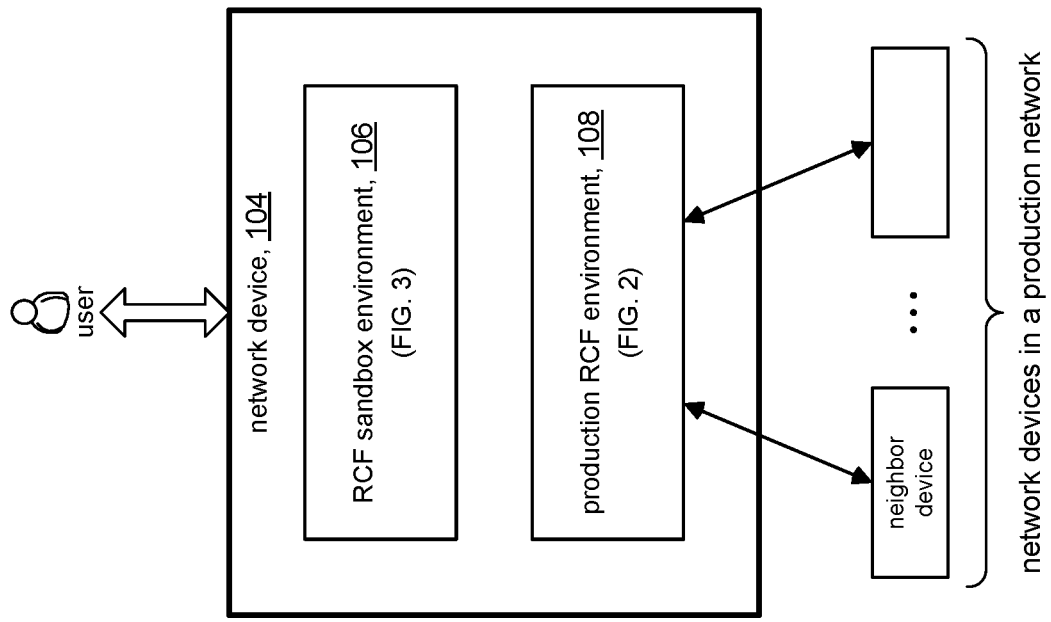
FIGS. 1A and 1B represent illustrative configurations of a sandbox environment in accordance with some embodiments.

The present disclosure is directed to providing a simulation execution environment ("sandbox environment") for developing, testing, and debugging RCF functions. The sandbox environment executes separately from and independently of a live network deployment (also referred to as a production network). RCF functions in a production network can assess/process (1) network paths received from network devices in the production network and (2) network paths stored in the network device to be advertised to network devices in the production network. RCF functions in a sandbox environment, on the other hand, process user-provided network paths (test paths). For example, RCF functions running in a sandbox environment do not receive paths from network devices in a production network; nor are such paths advertised to network devices in the production network or stored locally in a live environment such as in a routing information base (RIB). Network paths, path attributes, and other state information in the sandbox environment are provided by the user. The user can specify paths, their attributes, and other state information, or such information can be obtained from network traffic in a production network (e.g., captured using network monitoring tools, directly accessing a live network device, etc.) and provide the information to the sandbox environment.

The sandbox provides an execution environment that facilitates developing, testing, and debugging a user's RCF functions by providing a context that simulates a production environment without the user having to set up the context. The sandbox execution environment can shorten development and troubleshooting times by obviating the need for the user to set up an execution environment within which to run their RCF functions.

A workflow in accordance with some embodiments can include:
- initializing the state of the sandbox environment by providing state information such as path attributes and various environmental variables
- inputting one or more RCF functions to be tested
- inputting network paths to be assessed against the RCF functions
  - network paths can be created by the user
  - network paths can be collected from a monitoring device
- inputting expected outcomes when the paths are assessed by the RCF functions, outcomes include:
  - permit or deny evaluation for each path
  - attribute modifications
- initiating a sandbox run where the RCF functions are executed against the paths and the sandbox produces output comprising:
  - an indication whether a path matched the expected permit/deny evaluation
  - an indication whether an attribute was modified as expected
- enabling debugging of the RCF functions, including displaying a comparison of actual output with expected results and allowing the user to modify the functions and iterate the simulation In some embodiments, the sandbox environment can run on a computer other than on a live network device. In other embodiments, the sandbox environment can run on a live network device but in an address space separate from the address space of the live execution environment so that the sandbox environment does not affect activities in the live environment.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1A:
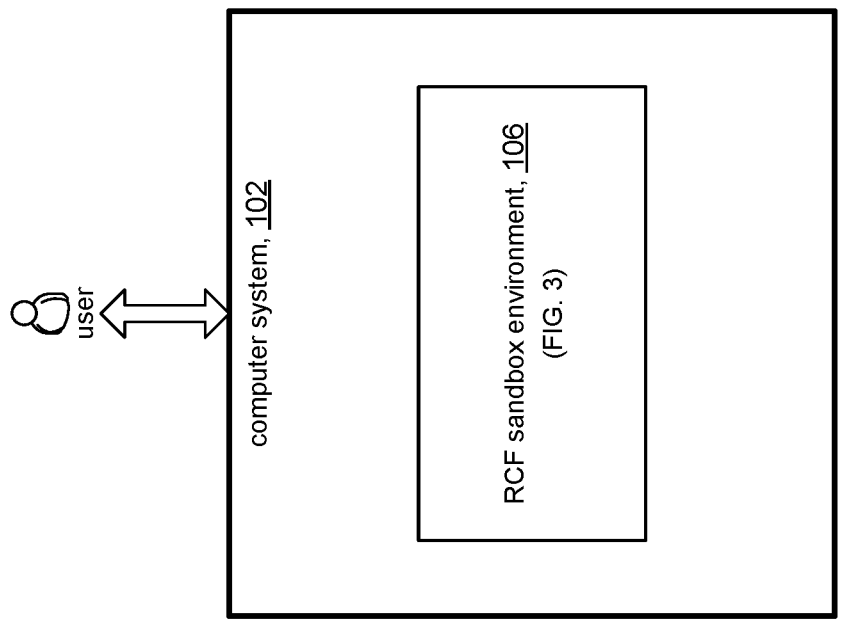

FIGS. 1A and 1B are block diagram representations illustrating configurations of an RCF sandbox environment in accordance with various embodiments of the present disclosure. FIG. 1A, for example, shows a computer system 102 that can run an instance of RCF sandbox execution environment 106. The computer system 102 can be any suitable computing system such as a network manager/controller in a network deployment or a standalone computer (e.g., desktop computer, laptop computer, etc.). In some embodiments, the RCF sandbox environment 106 can run as one or more processes on computer system 102. In other embodiments, the RCF sandbox environment 106 can run in a virtual machine instance (not shown) executing on the computer system 102.

FIG. 1B represents a network device 104 that is deployed in a production network (i.e., a live, deployed network device in a live deployment). A production RCF execution environment 108 runs on the network device 104 to interact with other network devices in the production network. The production RCF environment supports the exchange of network paths (e.g., BGP paths, Open Shortest Path First (OSPF), etc.) among the network devices in the production network. In accordance with some embodiments, the sandbox execution environment 104 can run on the network device 104 concurrently with, but independently of, the production RCF environment 108

A user (e.g., network support person) can write RCF functions and test those functions in the RCF sandbox environment 106, whether the sandbox environment is running on computer system 102 or on a deployed network device 104. The user can access the computing device (102, 104) directly via a maintenance port or remotely. A suitable user interface can allow the user to enter data to execute RCF functions and to retrieve results from executing the RCF functions.

The discussion will now turn to a description of the RCF sandbox execution environment 106 in accordance with some embodiments. First, a description of a live production environment within which RCF functions operate will be given for context and for comparison purposes.

Figure 2:
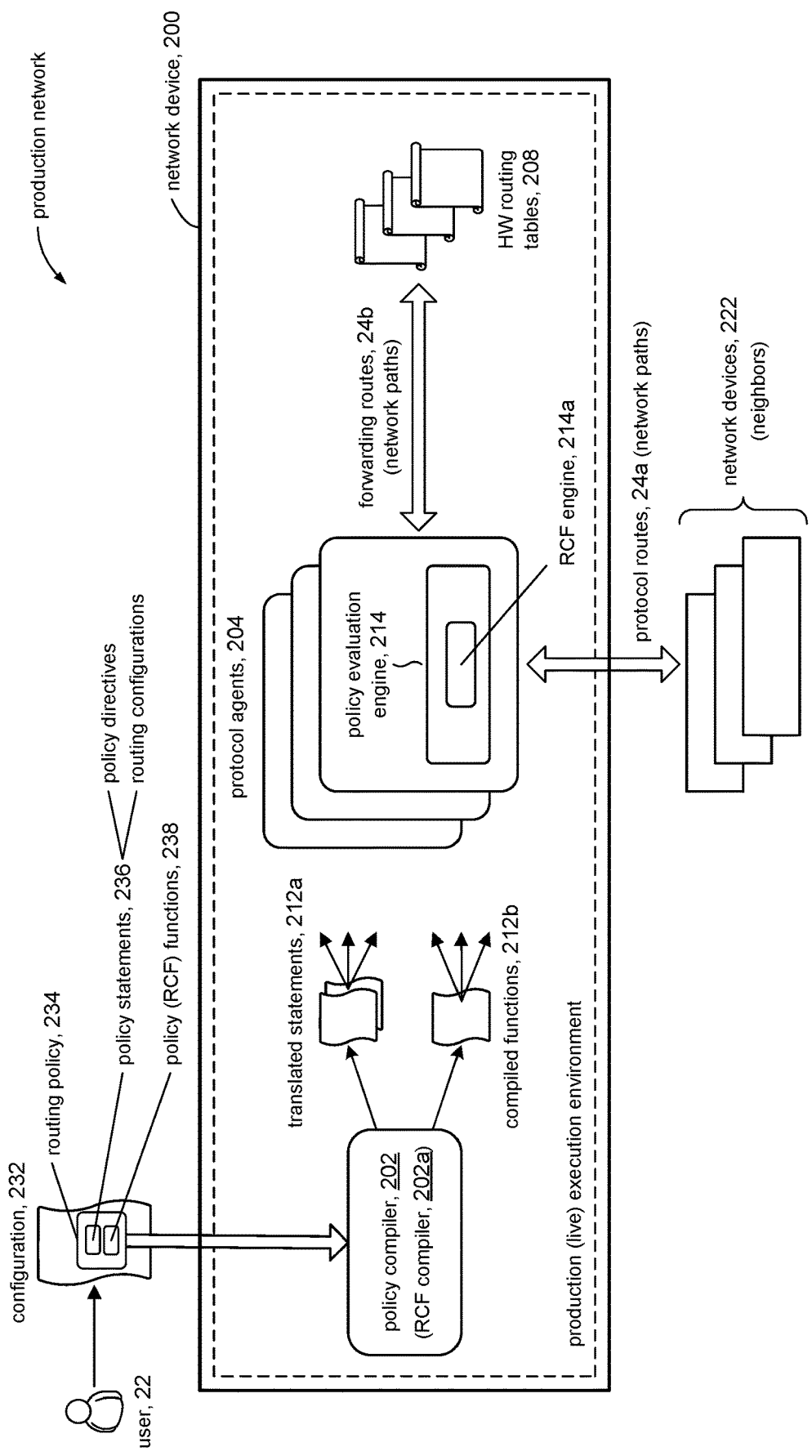
FIG. 2 represents an illustrative example of a production (live) execution environment.

FIG. 2 is a generalized schematic representation of a workflow in a network device for processing routes to illustrate RCF processing in the context of a production execution environment. Network device 200, for example, can include policy compiler 202 to process a routing policy 234. The routing policy 234 assesses or otherwise evaluates network paths which are exchanged among network devices 222 in the production network. Examples used in the present disclosure refer to BGP; however, it will be appreciated that the present disclosure can be adapted for use with other routing protocols, for example, OSPF (Open Shortest Path First). The routing policy 234 can be defined by a network administrator. The routing policy is used to assess which BGP paths received from neighbor devices 222 can be imported into the routing table(s) of a network device, and which BGP paths can be exported from the network device to the neighbor devices.

Routing policy 234 can be contained in configuration file 232 which, for example, can be provided by user 22, a centralized network manager/controller (not shown), etc. Routing policy 234 can include routing policy statements 236 (e.g., policy directives, routing configurations, etc.) and routing control functions 238 defined using the RCF programming language and referred to herein as RCF functions.

Policy compiler 202 can include one or more components to compile or otherwise translate the user-readable text that constitutes routing policy 234 to a suitable internal representation that the network device can execute. In some embodiments, policy compiler 202 can include a translator to produce a suitable internal representation of the human-readable policy statements 236, generically represented in FIG. 2 as translated statements 212a, which can be executed by the network device.

Users (e.g., network or system administrators) can write RCF functions that express and evaluate policies such as route filtering and attribute modification in a programmatic fashion to facilitate processing of routes. Policy compiler 202 can include an RCF compiler 202a to produce a suitable internal representation of RCF functions 238, which is represented in FIG. 2 as compiled functions 212b (e.g., evaluation trees). An RCF compiler in accordance with some embodiments is disclosed in commonly owned U.S. Pub. No. US 2023/0038824, entitled "Efficient Runtime Evaluation Representation, External Construct Late-binding, and Updating Mechanisms For Routing Policies," which is incorporated herein by reference for all purposes.

In some embodiments, for example, components of RCF compiler 202a can include a lexical analyzer to perform lexical analysis on an RCF function to convert the RCF function into a stream or sequence of characters, which can then be tokenized to obtain a stream or sequence of tokens. A parse tree generator can perform syntax analysis on the stream or sequence of tokens to generate a parse tree based on the grammar of the language used to write the RCF function. A syntax tree builder can build a syntax tree from the parse tree that represents the semantics of the RCF function. A symbol table generator can generate a symbol table from the syntax tree that contains symbols which represent variables, external constructs (e.g., prefix lists, community lists, AS path access lists, etc.), subroutines, and so on in the RCF function. The symbol table ensures that all symbols resolve; e.g., subroutines and variables that are referenced should be defined in the user's code, external constructs should be defined in the global variable environment, and so on.

A type binder can scan the syntax tree to enforce type checking rules; for example, a multiplication operation should not be allowed if one of the multiplicands is of type "CHARACTER". An evaluation tree builder can use the syntax tree and symbol table to build a hierarchical structure called an evaluation tree that serves as an efficient representation of the RCF function for runtime evaluation.

Network device 200 can include protocol agents 204 that operate in accordance with various network protocols (e.g., spanning tree protocol, address resolution protocol, border gateway protocol, etc.) that communicate with other network devices 222 (neighbors, peers, etc.) to exchange (import and export) protocol routes 24a. Protocol agents 204 can execute the translated statements 212a and compiled functions 212b to assess or otherwise evaluate protocol routes 24a received from BGP neighbors 222 to be programmed (imported) in the hardware routing tables 208 of the network device. Conversely, the protocol agents 204 can assess forwarding routes stored in the hardware routing tables 208 to be advertised (exported) to BGP neighbors 222. Hardware routing tables 208 can comprise any suitable persistent memory, such as TCAMs, SRAMs, etc.

Each policy agent 204 can include a policy evaluation engine 214. During processing of a received route 24a, 24b, the translated statements 212a and compiled functions 212b that constitute the routing policy 234 can be executed by the policy evaluation engine 214 to determine whether to accept (import) the received route or advertise (export) the received route. For example, routes 24a received from a neighbor device 222 can be assessed to determine if the received route is allowed to be imported (e.g., programmed) in a forwarding table of network device 200. Conversely, a route 24b read out from a forwarding table of the network device can be assessed to determine if the route can be exported (e.g. advertised) to neighbor devices 222. Policy evaluation engine 214 represents an execution environment within which to execute the translated statements and compiled functions.

In accordance with some embodiments, the policy evaluation engine 214 can include or otherwise instantiate an RCF engine 214a that represents an execution environment for executing compiled functions 212b. The nature of the RCF execution environment depends on the nature of the particular implementation of RCF. In some embodiments, for example, RCF can be an interpreted language, not unlike the BASIC programming language, and RCF engine 214a can be an interpreter that interprets human-readable policy functions directly without compiling the functions. In other embodiments, RCF can be a partially compiled language. For example, policy functions can be compiled into an intermediate representation (e.g., bytecode) and RCF engine 214a can be an interpreter that interprets the intermediate representation. In some embodiments, the intermediate representation can be expressed as an evaluation tree, such as disclosed in commonly owned U.S. Pub. No. US 2023/0038824. In other embodiments, RCF can be compiled into binary code and RCF engine 214a can be a virtual machine that executes the binary code.

Figure 3:
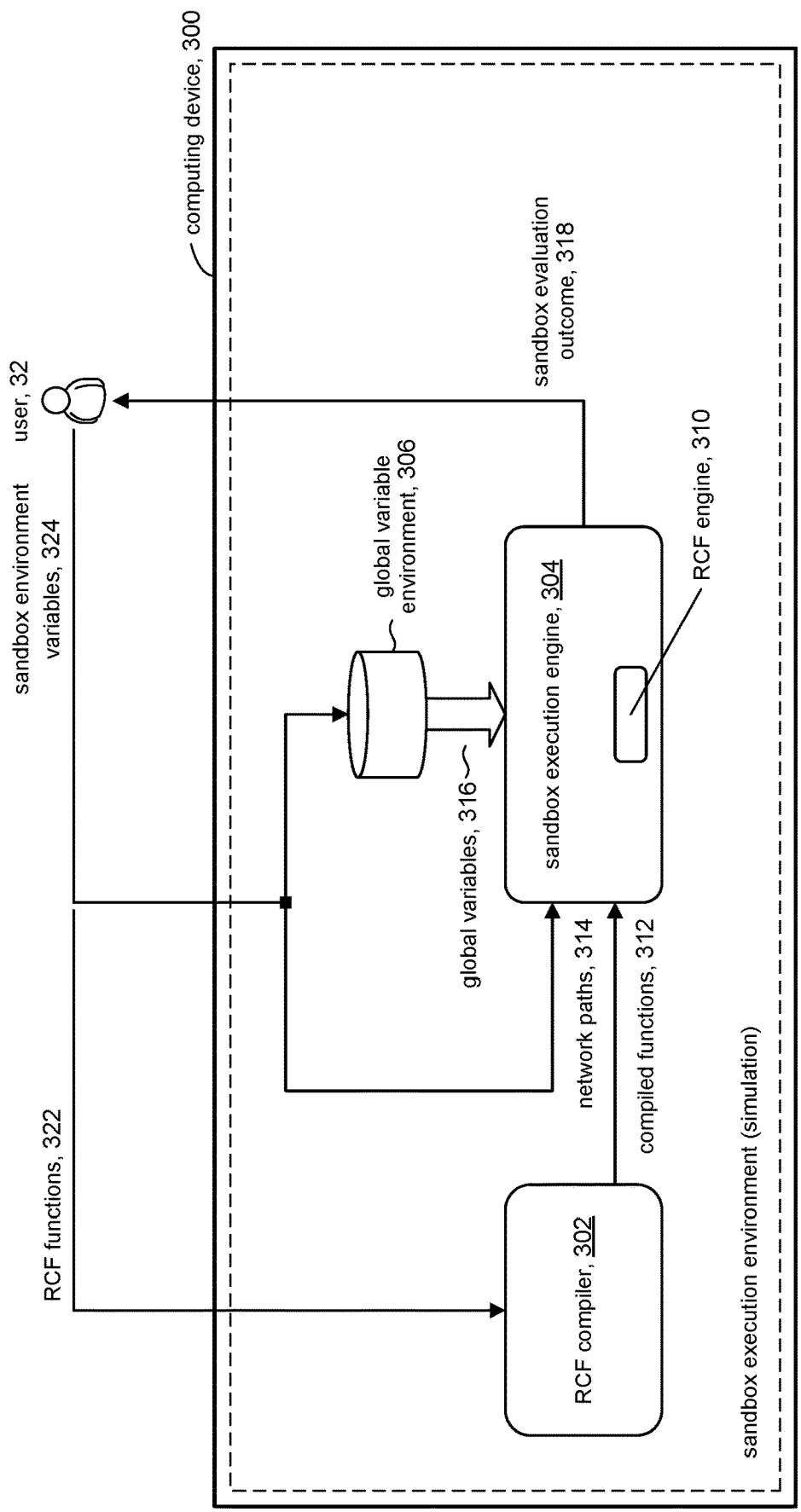
FIG. 3 represents an illustrative example of a sandbox execution environment in accordance with some embodiments.

FIG. 3 is a generalized schematic representation of a workflow in a computing device 300 for processing routes in the context of a sandbox execution environment in accordance with the present disclosure. In some embodiments, for example, the computing device 300 can be any suitable computing system such as a network manager/controller in a network deployment or a standalone computer (e.g. desktop computer, laptop, etc.). In some embodiments, the sandbox execution environment can comprise one or more processes running on computer device 300. In other embodiments, the sandbox execution environment can run in a virtual machine instance (not shown) executing on the computer device 300. In some embodiments, computer device 300 may be a live network device deployed in a production network. For example, the sandbox execution environment can run in the control plane of the network device, independently of the production execution environment.

In some embodiments, computing device 300 can include RCF compiler 302 (such as described in FIG. 2) to compile user-provided RCF functions 322 to produce compiled functions 312 (e.g., evaluation trees). As noted in FIG. 2, an example of an RCF compiler is disclosed in commonly owned U.S. Pub. No. US 2023/0038824, entitled "Efficient Runtime Evaluation Representation, External Construct Late-binding, and Updating Mechanisms For Routing Policies."

User-provided RCF functions 322 can be tested by evaluating the compiled RCF functions 312 against user-provided network test paths 314 in sandbox execution engine 304. A global variable environment 306 can store user-provided global variables 316 (e.g., path attributes, system attributes) for the sandbox execution engine 304. The sandbox execution engine can output results (sandbox evaluation outcomes) 318 of the evaluations to a user 32.

As noted above in connection with FIG. 2, network paths (routes) in a production network can be received from neighbor network devices 222 or read out from a network device's routing tables 208. By comparison, network paths 314 in a sandbox execution environment are provided by user 32. Similarly, whereas global variables such as path attributes in a production network can derive from attributes in the network paths received from neighbor devices or read out from the network device's routing tables, global variables 316 in a sandbox execution environment are provided by user 32, for example, via sandbox environment variables (state information) 324. Global variables include path attributes which are attributes that derive from a path. In some embodiments, for example, BGP NLRI PREFIX and BGP AS PATH are examples of such path-specific global variables. Global variables also include system attributes which refer to system/environment specific settings and are not specific to any one path. For example, INSTANCE.AS is an example of a system-level global variable that refers to the Autonomous System (AS) number of the network device.

Network paths, path attributes, and other state information in the sandbox environment can be provided by the user. In some use cases, the user can provide paths, their attributes, and other state information. In other use cases, the user can capture network traffic from a production network using network monitoring tools (e.g., an MRT dump), by directly downloading the information from a live network device (e.g., via an EOS agent), etc. The paths, attributes, and other information can be obtained from the captured network traffic, and provide the information to the sandbox environment in a file (e.g., YAML/JSON). Multi-threaded Routing Toolkit (MRT) is a tool for capturing routing information. YAML is a recursive acronym for "YAML Ain't Markup Language," and is a human-readable data serialization language that can be used for configuration files. JavaScript Object Notation (JSON) is a format for storing and transporting data.

Figure 4B:
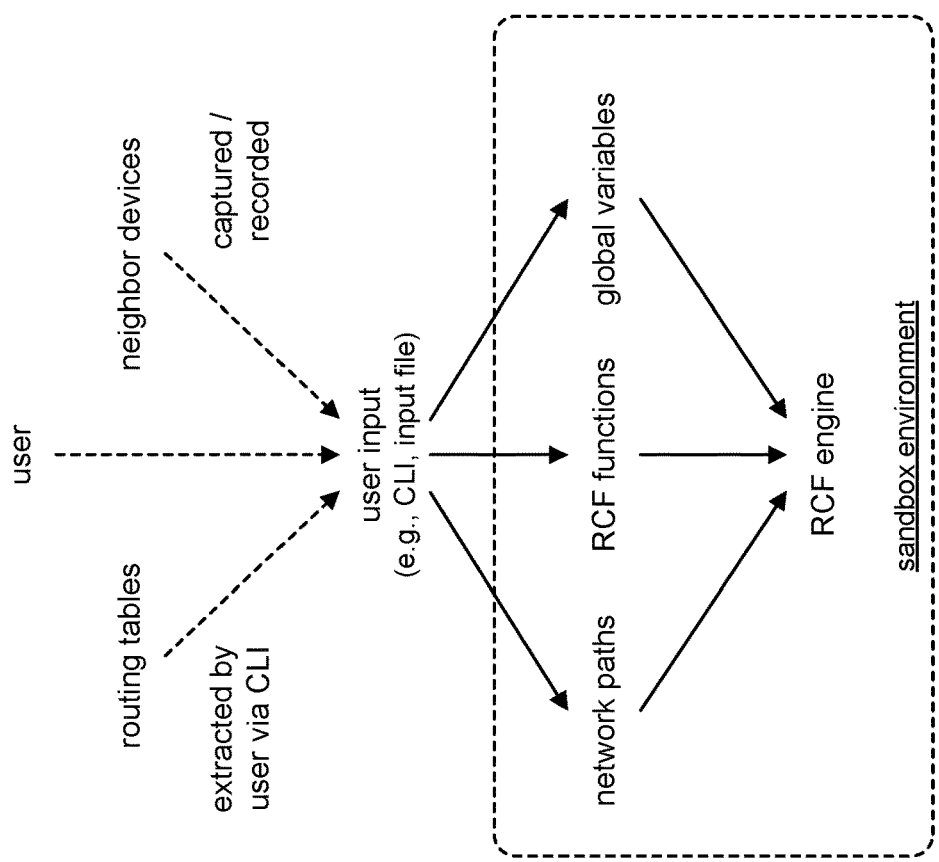
FIGS. 4A and 4B illustrate data flows in a production environment as compared to a sandbox environment.
Figure 4A:
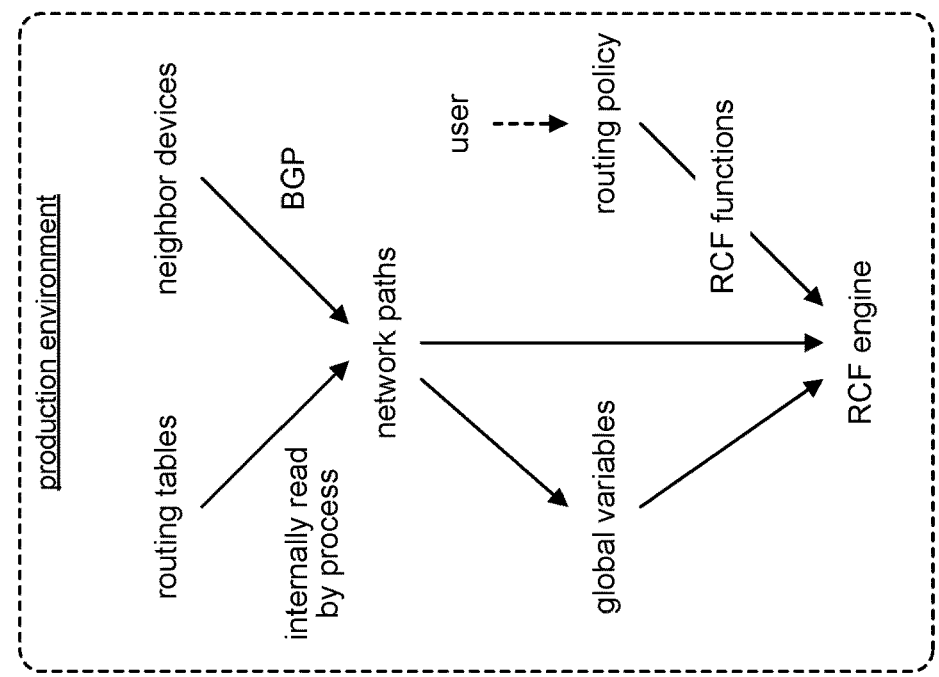

FIGS. 4A and 4B illustrate the data flow of network paths and global variables in a production environment (FIG. 4A) as compared to a sandbox environment (FIG. 4B). In a production environment (FIG. 4A), network paths can be read out from the routing tables of the network device, or received (e.g., via BGP) from neighbor devices. Global variables such as path attributes can be derived from attributes in the network paths. RCF functions are defined in a routing policy created by a user. The RCF engine can evaluate the network paths by executing the RCF functions against the network paths using the global variables to provide context for the RCF functions.

By contrast, in a sandbox environment (FIG. 4B), RCF functions, network paths, and global variables are provided by a user, for example, via a CLI, in an input file, etc. The user can define their RCF functions of interest. In some instances, the user can specify the network paths to be evaluated and the global variable to define the context within which to evaluate the network paths. In other instances, the user can extract or capture network paths and global variables from a live system. The user can then import the extracted information to the sandbox environment; e.g., in an input file.

Following is an illustrative example of a network path:
PATH_1:
BGP NLRI PREFIX: 192.0.2.0/24
BGP AS PATH: 64497 64498,
and the following is an example of path-specific global variables and values that derive from the above network path:
prefix: 192.0.2.0/24
as_path: 64497 64498
An example of a system-level global variable attribute is:
instance.as: 64496,
where INSTANCE.AS is the Autonomous System (AS) number of the network device (e.g., a router), which as shown above is set to '64496'.

Following is an illustrative example of an RCF function:
function PREPEND_INSTANCE_AS( ) {
  if prefix is 192.0.2.0/24 {
    as_path prepend instance.as;
  }
  return true;
}
As noted above, the path-specific and system-level global variables are accessible in the sandbox execution environment to provide context for the RCF function for processing/evaluating a network path. Using the example above, the above RCF function example will change the path-level global variable AS_PATH from '64497 64498' to '64496 64497 64498'.

Figure 5:
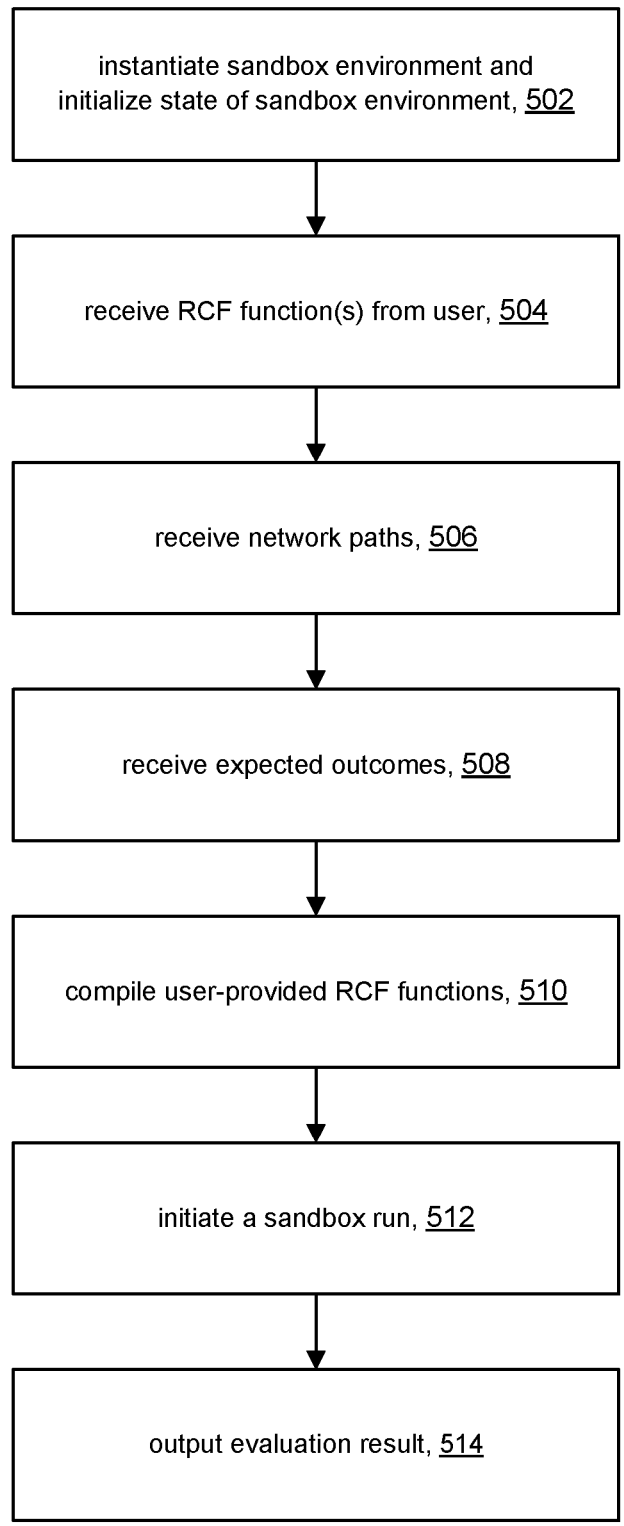
FIG. 5 represents an illustrative workflow in a sandbox environment in accordance with some embodiments.

Referring to FIG. 5, the discussion will now turn to a high-level description of a workflow in a sandbox execution environment for executing RCF functions in accordance with some embodiments. As explained above, in some embodiments the sandbox environment can run on a computer system (e.g., 102, FIG. 1A). The computer system can include computer executable program code (e.g., stored on a non-transitory computer-readable storage memory device), which when executed by a CPU (e.g., 702, FIG. 7), can cause the computer system to perform processing in accordance with FIG. 5.

In other embodiments, the sandbox environment can run on a live network device; e.g., in the control plane of the network device (e.g., 104, FIG. 1B). For example, the network device can include one or more processing units (circuits), which when operated, can cause the network device to perform processing in accordance with FIG. 5. Processing units (circuits), for example, can include general CPUs that operate by way of executing computer program code stored on a non-volatile computer readable storage medium (e.g., read-only memory); e.g., CPU 708 (FIG. 7) in the control plane can be a general CPU.

The operation and processing blocks described below are not necessarily executed in the order shown. Operations can be combined or broken out into smaller operations in various embodiments. Operations can be allocated for execution among one or more concurrently executing processes and/or threads.

At block 502, the computing system 102 or network device 104, collectively referred to herein as "computing device," can instantiate a sandbox execution environment (e.g. 106) and initialize the state of the sandbox environment. In some embodiments, for example, the computing device can receive sandbox environment variables (e.g., 324) from a user. The sandbox environment variables can include global variables that provide context for testing the RCF functions. The sandbox environment variables can include configuration information to configure the sandbox environment itself; for instance:
  system-level global variables such as, but not limited to:
    instance.as—AS number of the network device
    peer address—IP address of the peer (neighbor) from which a path was received
    virtual routing and forwarding (VRF)—which VRF instance the sandbox is simulating
    where the RCF is supposed to be applied; e.g., BGP inbound, BGP outbound
  other configuration information for the sandbox beyond global variables such as, but not limited to:
    whether additional tracing should be collected during the evaluation (this may take more time but makes debugging easier)
    coverage—check whether some RCF code is not evaluated by the test cases, a user may want to ensure they have coverage of all of their RCF code by ensuring that every line is executed by at least one test path
At block 504, the computing device can receive RCF functions (e.g., 322, FIG. 3) from the user via a suitable interface. In some embodiments, for example, the computing device can be configured with a command line interface (CLI) to allow a user to enter RCF functions on a command line or to specify a file that contains RCF functions. In some embodiments, the interface can provide remote access to the computing device. The interface can be a machine interface for access by a computer user (e.g., an automated test system and the like) rather than human users.

At block 506, the computing device can receive network paths from the user to be assessed against the user-provided RCF functions.

At block 508, the computing device can receive a list of one or more expected outcomes for the paths to be evaluated or otherwise assessed by the user-provided RCF functions. Expected outcomes can include PERMIT or DENY evaluations for a path, modifications to path attributes, setting or otherwise modifying environment variables, and the like. In some embodiments, this action may be omitted for a use case where the user does not know (and thus cannot provide) an expected outcome/status.

At block 510, the computing device can compile the user-provided RCF functions to generate compiled functions. FIG. 3, for example, shows that RCF functions 322 can be compiled by RCF compiler 302 to produce compiled functions 312.

At block 512, the computing device can initiate a sandbox run to test the user-provided RCF function. For example, the user can run the compiled RCF functions against the user-provided paths to evaluate the paths. FIG. 3, for example, shows that the compiled functions 312 can be provided to sandbox execution engine 304. The user-provided global variables 316 can provide context for the sandbox execution engine to evaluate the paths.

At block 514, the computing device can output results of the evaluation of a network path made by the user-provided RCF function. The user-provided RCF functions can be assessed based on outcomes of the network path evaluation. Evaluation of the network path can include determining the PERMIT or DENY of the path; for example, whether the path can be programmed or not. The sandbox execution engine can indicate whether the PERMIT or DENY status from the evaluation of path matches expected status. As noted above in block 508, in some use cases the user may not know (and thus cannot provide) an expected outcome/status. Accordingly, the sandbox execution engine can present the output without making a match against an expected outcome/status.

Path evaluation can include changing one or more attributes of the path; for example, changing a destination address, an AS path, etc. The sandbox execution engine can indicate whether the path attributes of an evaluated path were modified as expected. Consider, for example, that the user wants to test the following RCF function:

function PREPEND_INSTANCE_AS( ) {
        if prefix is 192.0.2.0/24 {
            as_path prepend instance.as;
        }
        return true;
    } where the user sets the system-level global variable INSTANCE.AS to '64496'. If the user runs the sandbox with the following path:
    PATH_1:
    prefix: 192.0.2.0/24
    as_path: 64497 64498,
the expected outcome would be:
    PATH_1:
    prefix: 192.0.2.0/24
    as_path: 64496 64497 64498,
The path attribute can be tested against an expected path attribute to verify operation of the RCF function.

Path evaluation can include setting or otherwise changing one or more global variables. The sandbox execution engine can indicate whether certain global variables were modified as expected.

FIGS. 6A and 6B represent a CLI display 600 (e.g., on a laptop display, on a web browser, etc.), showing an illustrative sandbox session. FIG. 6A shows user-provided input to set up the sandbox environment, including a global variable 602, an RCF function 604, and a routing policy 606 to invoke the RCF function. FIG. 6B shows a command 612 to compile the RCF function 604 and routing policy 606 with an indication that the compilation was successful. The run command 614 initiates execution of the routing policy, which invokes the RCF function. Results 614 of the evaluation are then displayed in the CLI display 600.

Figure 7:
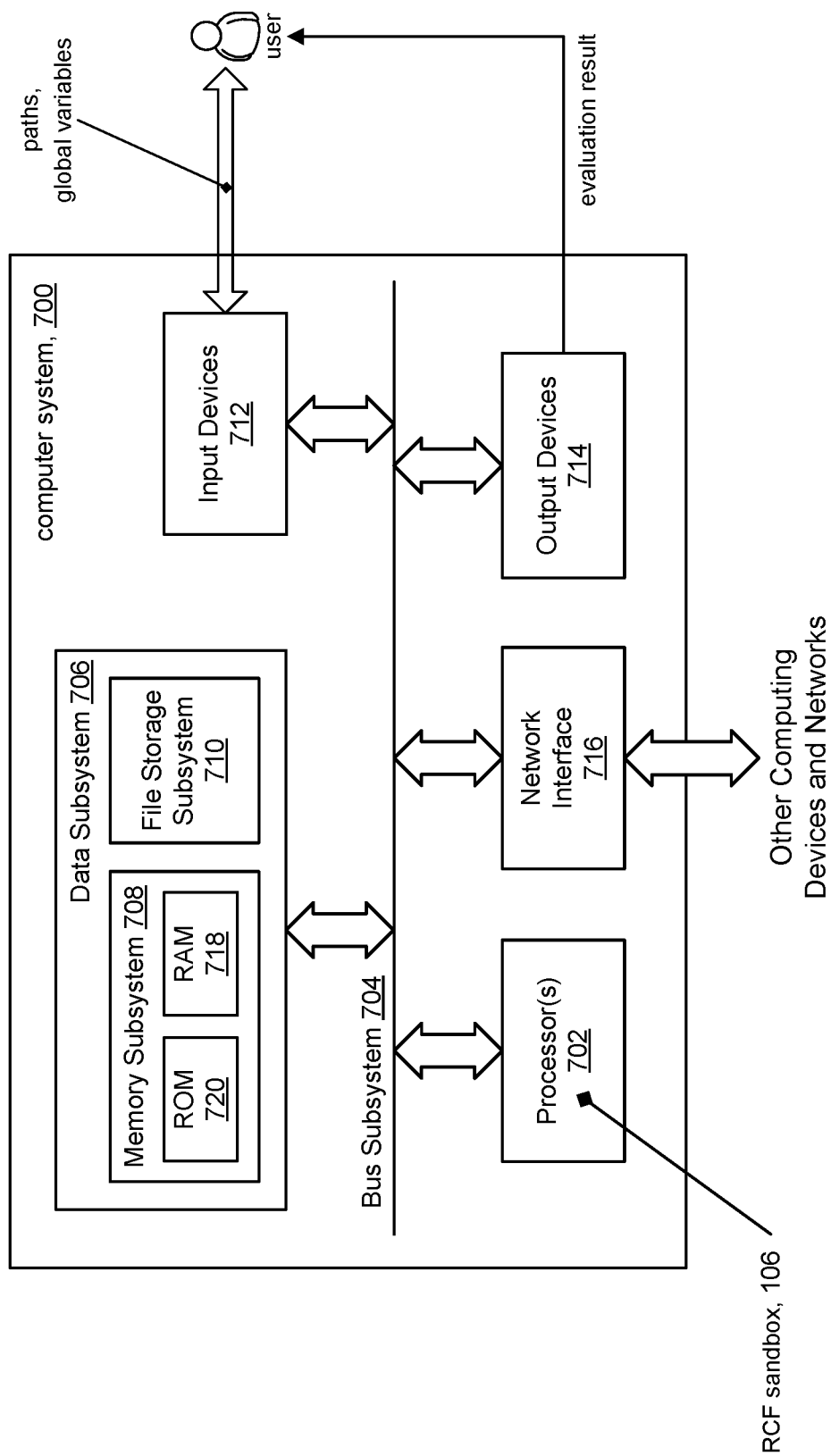
FIG. 7 is a block diagram representation of a computer system that can host a sandbox environment in accordance with some embodiments.

FIG. 7 depicts a simplified block diagram of an example computer system 700 according to certain embodiments. The computer system can be a standalone computer, a network manager/controller to manage network devices in a deployment, etc. As shown in FIG. 7, computer system 700 includes one or more processors 702 that communicate with a number of peripheral devices via bus subsystem 704. These peripheral devices include data subsystem 706 (comprising memory subsystem 708 and file storage subsystem 710), user interface input devices 712 (e.g., to input paths for evaluation and global variables), user interface output devices 714, and network interface subsystem 716.

Bus subsystem 704 can provide a mechanism that enables the various components and subsystems of computer system 700 to communicate with each other as intended. Although bus subsystem 704 is shown schematically as a single bus, alternative embodiments of the bus subsystem can utilize multiple busses.

Network interface subsystem 716 can serve as an interface for communicating data between computer system 700 and other devices; e.g., network devices, client computing devices for remote access, etc. Embodiments of network interface subsystem 716 can include, e.g., an Ethernet card, a Wi-Fi and/or cellular adapter, and/or the like. Local access to computer system 700 can be provided via input devices 712 (e.g., keyboard, pointing devices, etc.) and output devices 714 (e.g., a computer monitor, etc.).

Data subsystem 706, comprising memory subsystem 708 and file/disk storage subsystem 710, represents non-transitory computer-readable storage media that can store program code and/or data, which when executed by processor 702, can cause processor 702 to perform operations in accordance with embodiments of the present disclosure, for example to implement RCF sandbox execution environment 106 (FIG. 1).

Memory subsystem 708 includes memory circuits such as main random access memory (RAM) 718 for storage of instructions and data during program execution and read-only memory (ROM) 720 in which fixed instructions are stored. File storage subsystem 710 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and many other configurations having more or fewer components than system 700 are possible.

Figure 8:
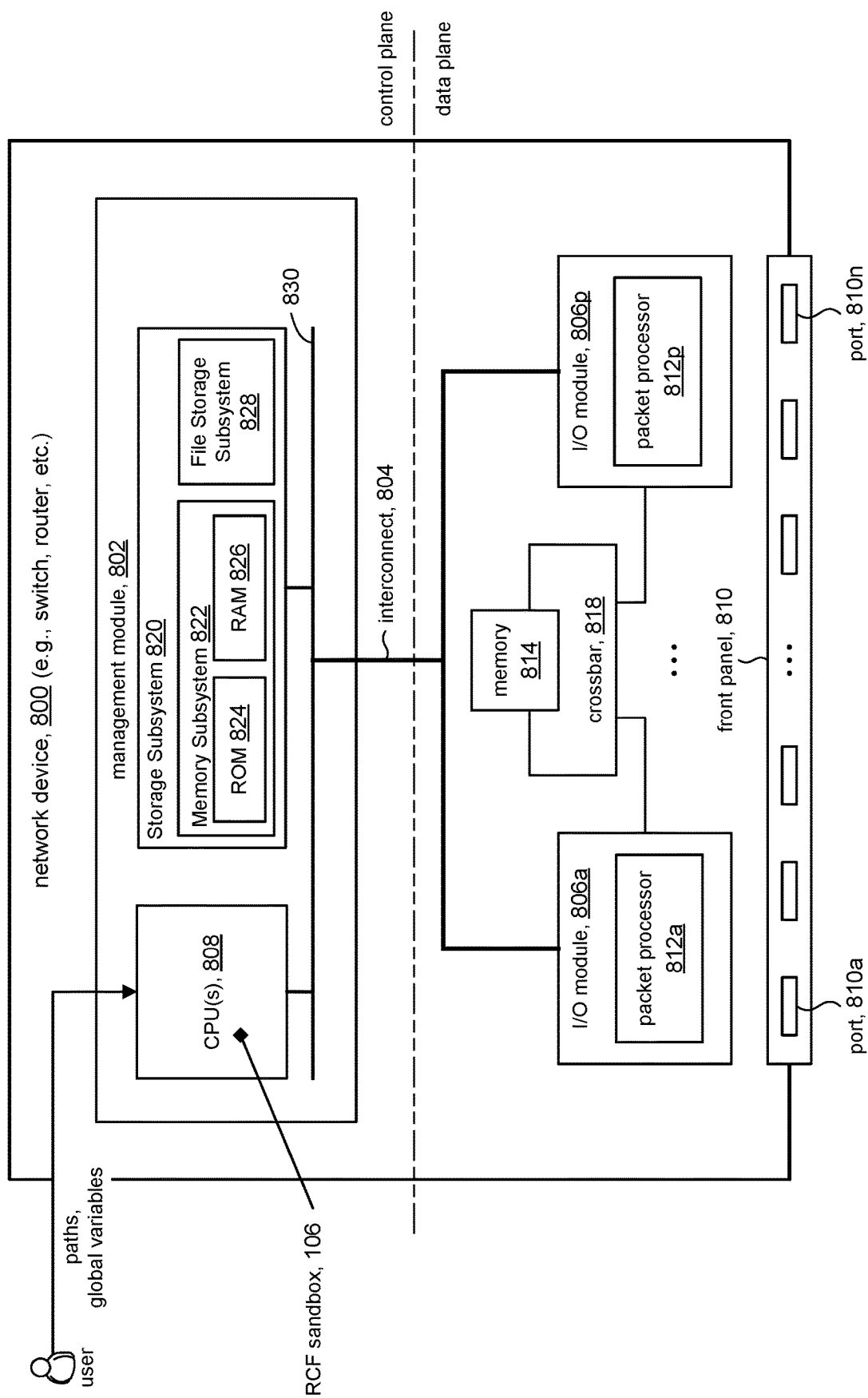
FIG. 8 is a block diagram representation of a network device that can host a sandbox environment in accordance with some embodiments.

FIG. 8 is a schematic representation of a network device 800 (e.g., a router, switch, firewall, and the like) that can be adapted in accordance with the present disclosure. In some embodiments, for example, network device 800 can include a management module 802, one or more I/O modules (switches, switch chips) 806a-806p, and a front panel 810 of I/O ports (physical interfaces, I/Fs) 810a-810n. Management module 802 can constitute the control plane of network device 800 (also referred to as the control layer or simply the central processing unit, CPU), and can include one or more CPUs 808 for managing and controlling operation of network device 800 in accordance with the present disclosure. Each CPU 808 can be a general-purpose processor, such as an Intel®/AMD® x86, ARM® microprocessor and the like, that operates under the control of software stored in a memory device/chips such as read-only memory (ROM) 824 or random-access memory (RAM) 826. The control plane provides services that include traffic management functions such as routing, security, load balancing, analysis, and the like.

The one or more CPUs 808 can communicate with storage subsystem 820 via bus subsystem 830. Other subsystems, such as a network interface subsystem (not shown in FIG. 8), may be on bus subsystem 830. Storage subsystem 820 can include memory subsystem 822 and file/disk storage subsystem 828. Memory subsystem 822 and file/disk storage subsystem 828 represent examples of non-transitory computer-readable storage devices that can store program code and/or data, which when executed by one or more CPUs 808, can cause one or more CPUs 808 to perform operations in accordance with embodiments of the present disclosure, for example to implement RCF sandbox execution environment 106 (FIG. 1).

Memory subsystem 822 can include a number of memories such as main RAM 826 (e.g., static RAM, dynamic RAM, etc.) for storage of instructions and data during program execution, and ROM (read-only memory) 824 on which fixed instructions and data can be stored. File storage subsystem 828 can provide persistent (i.e., non-volatile) storage for program and data files, and can include storage technologies such as solid-state drive and/or other types of storage media known in the art.

CPUs 808 can run a network operating system stored in storage subsystem 820. A network operating system is a specialized operating system for network device 800. For example, the network operating system can be the Arista EOS® operating system, which is a fully programmable and highly modular, Linux-based network operating system developed and sold/licensed by Arista Networks, Inc. of Santa Clara, California. It is understood that other network operating systems may be used.

Bus subsystem 830 can provide a mechanism for the various components and subsystems of management module 802 to communicate with each other as intended. Although bus subsystem 830 is shown schematically as a single bus, alternative embodiments of the bus subsystem can utilize multiple buses.

The one or more I/O modules 806a-806p can be collectively referred to as the data plane of network device 800 (also referred to as the data layer, forwarding plane, etc.). Interconnect 804 represents interconnections between modules in the control plane and modules in the data plane. Interconnect 804 can be any suitable bus architecture such as Peripheral Component Interconnect Express (PCIe), System Management Bus (SMBus), Inter-Integrated Circuit (I2C), etc.

I/O modules 806a-806p can include respective packet processing hardware comprising packet processors 812a-812p (collectively 812) to provide packet processing and forwarding capability. Each I/O module 806a-806p can be further configured to communicate over one or more ports 810a-810n on the front panel 810 to receive and forward network traffic. Packet processors 812 can comprise hardware (circuitry), including for example, data processing hardware such as an application specific integrated circuit (ASIC), field programmable gate array (FPGA), processing unit, and the like, which can be configured to operate in accordance with the present disclosure. Packet processors 812 can include forwarding lookup hardware such as, for example, but not limited to content addressable memory such as ternary CAMs (TCAMs) and auxiliary memory such as static RAM (SRAM).

Memory hardware 814 can include buffers used for queueing packets. I/O modules 806a-806p can access memory hardware 814 via crossbar 818. It is noted that in other embodiments, the memory hardware 814 can be incorporated into each I/O module. The forwarding hardware in conjunction with the lookup hardware can provide wire speed decisions on how to process ingress packets and outgoing packets for egress. In accordance with some embodiments, some aspects of the present disclosure can be performed wholly within the data plane.

Embodiments in accordance with the present disclosure allow users to run their RCF functions in a sandbox environment in a live network device in an execution environment that is separate from the production environment. They do not need to spin up a protocol agent or other similar process to generate paths. Users can provide the input data required to evaluate their RCF functions, and their specified RCF function would evaluate against this input with the same behavior as it would if this input were seen in a live setting.

FURTHER EXAMPLES

Features described above as well as those claimed below may be combined in various ways without departing from the scope hereof. The following examples illustrate some possible, non-limiting combinations:

(A1) A method in a computer system for testing RCF functions, the method comprising: receiving from a user state information for a sandbox execution environment, wherein the sandbox execution environment is separate from a live execution environment in which network paths in a production network are processed using a first plurality of RCF functions; receiving from the user a second plurality of RCF functions separate from the first plurality of RCF functions; receiving from the user a plurality of network test paths; evaluating the plurality of network test paths with the second plurality of RCF functions to test the second plurality of RCF functions, including executing the second plurality of RCF functions in a context of the sandbox execution environment using the state information, wherein the network test paths received from the user are not processed in the live execution environment; and presenting results of evaluating the plurality of network test paths with the second plurality of RCF functions.

(A2) The method denoted as (A1), further comprising receiving expected evaluation outcomes associated with the plurality of network test paths and presenting comparison results based on comparing evaluation outcomes of the plurality of network test paths with the expected evaluation outcomes.

(A3) For the method denoted as any of (A1) through (A2), wherein evaluation outcomes include a PERMIT or DENY determination, modification to path attributes in the network test paths, and setting global variables based on the path attributes in the network test paths.

(A4) For the method denoted as any of (A1) through (A3), wherein the test network paths include path attributes, the method further comprising receiving from the user expected modifications to the path attributes and presenting comparison results based on comparing modifications to the path attributes with the expected modifications to the path attributes.

(A5) The method denoted as any of (A1) through (A4), further comprising receiving the plurality of network test paths from the user in a data file or via a command line interface.

(A6) For the method denoted as any of (A1) through (A5), wherein the plurality of network test paths received from the user is obtained from network data captured using a network monitoring tool.

(A7) For the method denoted as any of (A1) through (A6), wherein the computer system is not connected to the production network, wherein the live execution environment runs on a network device separate from the computer system and is connected to the production network.

(A8) For the method denoted as any of (A1) through (A7), wherein the computer system is a network device connected to the production network, wherein the sandbox execution environment and the live execution environment both run on the network device but independently of each other.

(B1) A computing device comprising: one or more computer processors; and a computer-readable storage device comprising instructions for controlling the one or more computer processors to: instantiate a sandbox execution environment; receive from a user state information for the sandbox execution environment, wherein the sandbox execution environment; receive from the user a plurality of RCF functions; receive from the user a plurality of network test paths; evaluate the plurality of network test paths with the plurality of RCF functions to test the plurality of RCF functions, including executing the plurality of RCF functions in a context of the sandbox execution environment using the state information, wherein the network test paths received from the user are not processed in a live execution environment; and present results of evaluation of the plurality of network test paths with the plurality of RCF functions.

(B2) For the computing device denoted as (B1), wherein the sandbox execution environment is separate from the live execution environment in which network paths in a production network are processed using a plurality of RCF functions separate from the plurality of RCF functions received from the user.

(B3) For the computing device denoted as any of (B1) through (B2), wherein the network test paths are obtained from network traffic captured from the live execution environment using a network monitoring tool.

(B4) For the computing device denoted as any of (B1) through (B3), wherein the computer-readable storage device further comprises instructions for controlling the one or more computer processors to receive expected evaluation outcomes associated with the plurality of network test paths and present results of a comparison between evaluation outcomes of the plurality of network test paths and the expected evaluation outcomes.

(B5) For the computing device denoted as any of (B1) through (B4), wherein the computer-readable storage device further comprises instructions for controlling the one or more computer processors to receive from the user expected modifications to path attributes in the network test paths and present results of a comparison between modifications to the path attributes with the expected modifications to the path attributes.

(B6) For the computing device denoted as any of (B1) through (B5), wherein the computing device is not connected to a production network, wherein the live execution environment runs on a network device separate from the computing device and is connected to the production network.

(B7) For the computing device denoted as any of (B1) through (B6), wherein the computing device is a network device connected to the production network, wherein the sandbox execution environment and the live execution environment both run on the network device but independently of each other.

(C1) A non-transitory computer-readable storage device in a computing device, the non-transitory computer-readable storage device having stored thereon computer executable instructions, which when executed, cause the computing device to: instantiate a sandbox execution environment; receive from a user state information for the sandbox execution environment, wherein the sandbox execution environment; receive from the user a plurality of RCF functions; receive from the user a plurality of network test paths; evaluate the plurality of network test paths with the plurality of RCF functions to test the plurality of RCF functions, including executing the plurality of RCF functions in a context of the sandbox execution environment using the state information, wherein the network test paths received from the user are not processed in a live execution environment; and present results of evaluation of the plurality of network test paths with the plurality of RCF functions.

(C2) For the non-transitory computer-readable storage device denoted as (C1), wherein the network test paths are obtained from network traffic captured from the live execution environment using a network monitoring tool.

(C3) For the non-transitory computer-readable storage device denoted as any of (C1) through (C2), wherein the computer executable instructions, which when executed, further cause the network device to receive expected evaluation outcomes and present results of a comparison between the expected evaluation outcomes with evaluation outcomes from evaluating the plurality of network test paths.

(C4) For the non-transitory computer-readable storage device denoted as any of (C1) through (C3), wherein the computing device is not connected to a production network, wherein the live execution environment runs on a network device separate from the computing device and is connected to the production network.

(C5) For the non-transitory computer-readable storage device denoted as any of (C1) through (C4), wherein the computing device is a network device connected to the production network, wherein the sandbox execution environment and the live execution environment both run on the network device but independently of each other.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a computer system for testing RCF functions, the method comprising:
receiving, from a user, state information for a sandbox execution environment, wherein the sandbox execution environment is separate from a live execution environment in which network paths in a production network are processed in accordance with a routing policy comprising a plurality of RCF functions, wherein the state information comprises path attributes and environment variables;
receiving, from the user, a user-provided RCF function;

receiving from the user a plurality of network test paths;
evaluating the plurality of network test paths with the user-provided RCF function to test the user-provided RCF function, including executing the user-provided RCF function in a context of the sandbox execution environment using the state information, wherein the network test paths received from the user are not processed in the live execution environment; and
presenting results of evaluating the plurality of network test paths with the user-provided RCF function.

2. The method of claim 1, further comprising receiving expected evaluation outcomes associated with the plurality of network test paths and presenting comparison results based on comparing evaluation outcomes of the plurality of network test paths with the expected evaluation outcomes.

3. The method of claim 2, wherein evaluation outcomes include a PERMIT or DENY determination, modification to path attributes in the network test paths, and setting global variables based on the path attributes in the network test paths.

4. The method of claim 1, wherein the test network paths include path attributes, the method further comprising receiving from the user expected modifications to the path attributes and presenting comparison results based on comparing modifications to the path attributes with the expected modifications to the path attributes.

5. The method of claim 1, further comprising receiving the plurality of network test paths from the user in a data file or via a command line interface.

6. The method of claim 1, wherein the plurality of network test paths received from the user is obtained from network data captured using a network monitoring tool.

7. The method of claim 1, wherein the computer system is not connected to the production network, wherein the live execution environment runs on a network device separate from the computer system and is connected to the production network.

8. The method of claim 1, wherein the computer system is a network device connected to the production network, wherein the sandbox execution environment and the live execution environment both run on the network device but independently of each other.

9. A computing device comprising:
one or more computer processors; and
a computer-readable storage device comprising instructions for controlling the one or more computer processors to:
  instantiate a sandbox execution environment;
  receive, from a user, state information for the sandbox execution environment, wherein the sandbox execution environment;
  receive, from the user, a user-provided RCF function;
  receive, from the user, a plurality of network test paths;
  evaluate the plurality of network test paths with the user-provided RCF function to test the user-provided RCF function, including executing the user-provided RCF function in a context of the sandbox execution environment using the state information, wherein the network test paths received from the user are not processed in a live execution environment; and
  present results of evaluation of the plurality of network test paths with the user-provided RCF function.

10. The computing device of claim 9, wherein the sandbox execution environment is separate from the live execution environment in which network paths in a production network are processed in accordance with a routing policy comprising a plurality of RCF functions separate from the user-provided RCF function.

11. The computing device of claim 9, wherein the network test paths are obtained from network traffic captured from the live execution environment using a network monitoring tool.

12. The computing device of claim 9, wherein the computer-readable storage device further comprises instructions for controlling the one or more computer processors to receive expected evaluation outcomes associated with the plurality of network test paths and present results of a comparison between evaluation outcomes of the plurality of network test paths and the expected evaluation outcomes.

13. The computing device of claim 9, wherein the computer-readable storage device further comprises instructions for controlling the one or more computer processors to receive from the user expected modifications to path attributes in the network test paths and present results of a comparison between modifications to the path attributes with the expected modifications to the path attributes.

14. The computing device of claim 9, wherein the computing device is not connected to a production network, wherein the live execution environment runs on a network device separate from the computing device and is connected to the production network.

15. The computing device of claim 9, wherein the computing device is a network device connected to the production network, wherein the sandbox execution environment and the live execution environment both run on the network device but independently of each other.

16. A non-transitory computer-readable storage device in a computing device, the non-transitory computer-readable storage device having stored thereon computer executable instructions, which when executed, cause the computing device to:
  instantiate a sandbox execution environment;
  receive, from a user, state information for the sandbox execution environment, wherein the sandbox execution environment;
  receive, from the user, a user-provided RCF function plurality of RCF functions;
  receive, from the user, a plurality of network test paths;
  evaluate the plurality of network test paths with the user-provided RCF function to test the user-provided RCF function, including executing the user-provided RCF function in a context of the sandbox execution environment using the state information, wherein the network test paths received from the user are not processed in a live execution environment; and
  present results of evaluation of the plurality of network test paths with the user-provided RCF function.

17. The non-transitory computer-readable storage device of claim 16, wherein the network test paths are obtained from network traffic captured from the live execution environment using a network monitoring tool.

18. The non-transitory computer-readable storage device of claim 16, wherein the computer executable instructions, which when executed, further cause the network device to receive expected evaluation outcomes and present results of a comparison between the expected evaluation outcomes with evaluation outcomes from evaluating the plurality of network test paths.

19. The non-transitory computer-readable storage device of claim 16, wherein the computing device is not connected to a production network, wherein the live execution environment runs on a network device separate from the computing device and is connected to the production network.

20. The non-transitory computer-readable storage device of claim 16, wherein the computing device is a network device connected to the production network, wherein the sandbox execution environment and the live execution environment both run on the network device but independently of each other.

* * * * *